Patented Sept. 2, 1952

2,609,379

UNITED STATES PATENT OFFICE 2,609,379

PROCESS OF PREPARING 21-IODO-PREG-NENE-(5)-OL-(3)-ONE-(20)

Heinrich Ruschig, Frankfort-on-the-Main, Germany, assignor to Farbwerke Hoechst vormals Meister Lucius & Bruning, Frankfort-on-the-Main-Hochst, Germany No Drawing. Application February 8, 1951, Serial No. 210,097. In Germany March 2, 1950

3 Claims. (Cl. 260—397.4)

The present invention relates to 21-iodo-pregnene-(5)-ol-(3)-one-(20) and especially pertains to a process of carrying out the acid cleavage of 21-iodo-pregnene-(5)-ol-(3)-one-(20)-oxalic acid ester-(21), whereby 21-iodo-pregnene-(5)-ol-(3)-one-(20) is obtained. In my co-pending application Serial No. 90,037 filed April 27, 1949, for a "Process of preparing derivatives of 21-hydroxy-pregnene-(5)-ol-(3)-one-(20)" there is claimed a process of performing the acid cleavage of the oxalic acid ester named above in an alkaline medium. According to the description and the example of the said co-pending application, the acid cleavage may be carried out in an aqueous alkaline solution further containing an electrolyte.

Now, I have found that a considerable increase of the yield in 21-iodo-pregnene-(5)-ol-(3)-one-(20) is obtained if the acid cleavage of the 21-iodo-pregnene-(5)-ol-(3)-one-(20)-oxalic acid ester is carried out in a metal alcoholate solution, for example, in sodium- or potassium methylate solution or in sodium- or potassium ethylate solution.

As solvents for the metal alcoholates come into consideration, in the first line, the corresponding alcohols. It is advantageous to use solvents which are miscible with water since, in this case, 21-iodo-pregnene-(5)-ol-(3)-one-(20) may be precipitated, after the acid cleavage, by addition of water.

The iodo-pregnenolone formed may be used as intermediate for the production of further organic compounds. It may be caused to react, for instance, with salts of organic carboxylic acids. For this reason, it is possible to operate in anhydrous solvents, as described in French Patent 891,441, or to use aqueous organic solvents, as described in my co-pending application Serial 90,037 mentioned above.

The following examples serve to illustrate the invention, but they are not intended to limit it thereto.

(1) 43.8 grams ($\frac{1}{10}$ mol) of the sodium salt of pregnene-(5)-ol-(3)-one-(20)-oxalic acid ethyl ester-(21) are suspended in 500 cc. of absolute methanol. A solution of 25.4 grams of iodine in 600 cc. of methanol is caused to run into the mixture within 15 minutes at a temperature of —15° C., while stirring.

After a further half hour, a prepared solution of sodium methylate, consisting of 2.5 grams of sodium and 136 cc. of methanol, is slowly added to the reaction solution which is further stirred for 1 hour. 2 liters of water are then added by portions to the reaction solution in the course of 1 hour; during this operation, the 21-iodo-pregnene-(5)-ol-(3)-one-(20) precipitates. After standing over night, the solid matter is filtered with suction and washed with methanol of 30 per cent. strength. The yield amounts to about 35 grams of dry substance. If the 21-iodo-pregnene-(5)-ol-(3)-one-(20) shall be reacted any further, for instance with potassium acetate, it is advantageous to use the still slightly moist product.

(2) 8.76 grams of the sodium salt of pregnene-(5)-ol-(3)-one-(20)-oxalic acid ethyl ester-(21) are suspended in 100 cc. of absolute methanol. A solution of 5.08 grams of iodine in 120 cc. of methanol is caused to run into this mixture within 15 minutes at a temperature of —15° C., while stirring. A solution of sodium ethylate, consisting of 0.5 gram of sodium and 30 cc. of ethanol, is added and the whole is stirred for 2 hours. By precipitation with water, filtering with suction and washing with methanol of 30 per cent. strength, about 7 grams of 21-iodo-pregnene-(5)-ol-(3)-one-(20) are obtained.

I claim:

1. The process of preparing 21-iodo-pregnene-(5)-ol-(3)-one-(20) by acid cleavage of 21-iodo-pregnene-(5)-ol-(3)-one-(20)-oxalic ester-(21) in an alkaline medium, which consists in reacting 21-iodo-pregnene-(5)-ol-(3)-one-(20)-oxalic ester-(21) with an alkali metal alcoholate in a water-miscible alcohol.

2. The process of preparing 21-iodo-pregnene-(5)-ol-(3)-one-(20) by acid cleavage of 21-iodo-pregnene-(5)-ol-(3)-one-(20)-oxalic ester-(21) in an alkaline medium, which consists in reacting 21-iodo-pregnene-(5)-ol-(3)-one-(20)-oxalic acid ethyl ester-(21) with sodium methylate in methanol solution.

3. The process of preparing 21-iodo-pregnene-(5)-ol-(3)-one-(20) by acid cleavage of 21-iodo-pregnene-(5)-ol-(3)-one-(20)-oxalic ester-(21) in an alkaline medium, which consists in reacting 21-iodo-pregnene-(5)-ol-(3)-one-(20)-oxalic acid ethyl ester-(21) with sodium ethylate in ethanol solution.

HEINRICH RUSCHIG.

No references cited.